United States Patent Office 3,595,671
Patented July 27, 1971

3,595,671
CONTINUOUS DOUGH-MAKING PROCESS AND
COMPOSITIONS FOR USE THEREIN
Alfred Cooke and Harold G. P. Johannson, Montreal,
Quebec, and Jacques R. Rolland, Longueuil, Quebec,
Canada, assignors to Delmar Chemicals Limited, Ville
La Salle, Quebec, Canada
Filed Feb. 11, 1970, Ser. No. 10,462
Int. Cl. A21d 2/28, 2/22, 2/04
U.S. Cl. 99—91
14 Claims

ABSTRACT OF THE DISCLOSURE

In a high-speed, continuous dough-making process, the need to prepare a conventional liquid fermentation brew is eliminated by including in the dough formula a prepared bakery additive composition containing defined amounts of a food grade sulfhydryl-containing reducing agent, a food grade antioxidant and an oxidizing improver. This substantially reduces the overall time required for the preparation of yeast-leavened products by an improved continuous dough-making process using standard continuous dough-making equipment in a much shorter time, and with greater flexibility and convenience than hitherto.

BACKGROUND OF THE INVENTION

(a) Field of invention

This invention relates broadly to the production of yeast-leavened bakery products. More particularly, the invention is concerned with an improved, high-speed, continuous dough-making process, and to prepared bakery additive compositions and activated flours for use in such a process. The prepared additive compositions and activated flours according to this invention contain functional additive combinations, which enable yeast-leavened bakery products to be made in an improved continuous dough-making process. The process may be carried out using standard, but simplified, continuous dough-making equipment, and is characterized by a significantly reduced overall processing time due to the complete elimination of the fermentation period required, in conventional procedures, for the formation of the liquid fermentation brew prior to mixing, developing and further processing the dough.

(b) Description of prior art practise

In the production of yeast-leavened bread, the obtention of the desired, characteristic, bread-crumb structure and texture depends upon the formation, within a dough mixture, of a resilient, elastic, three-dimensional gluten matrix. This gluten matrix serves to retain the carbon dioxide liberated as a result of the action of yeast on fermentable constituents of the dough mixture, thus yielding a loaf of good volume, uniform grain and fine, soft texture. Further, the formation of the gluten network is associated with certain desirable rheological changes in the dough, notably an enhanced extensibility and elasticity, and consistency. The gluten matrix is believed to be formed sequentially by an initial rupture of disulfide bonds linking together individual protein units of the hydrated gluten elements of the flour in the dough mixture, a reorientation of the individual protein units with establishment of a coherent, three-dimensional gluten matrix, and, finally, interlocking of the gluten matrix by the reformation of disulfide groups as a result of the action of oxidising agents incorporated in the dough mixture.

In conventional processes, such as the sponge-dough process, for making baker's dough in batches, the formation of the required gluten matrix, to a large degree, results from the biochemical conditioning and physical working of the dough constituents which take place during fermentation. However, to give time for this, the dough, say, in the form of a sponge, must be set aside at a substantially constant temperature of around 80° F., under humid conditions, for several hours. Such a preliminary fermentation period, as it is known in the trade, is wasteful, both of time and space, and also reduces flexibility. Of recent years, an increasing proportion (now estimated to be around 60% of the total U.S. white pan bread production) of bread is being made by a continuous dough-making process in which flour and other dough ingredients are blended in a high-speed mixer/developer with a liquid fermentation brew, so that the intensive mechanical working of the dough assists in establishing a relatively uniform gluten matrix. In commercial practice, the continuous dough-making process is mainly effected using machinery manufactured either by Wallace and Tiernan Inc. and referred to as the Do-Maker equipment, or by Bakery Machinery Division, American Machine and Foundry Company, and referred to as the Amflow equipment.

The procedure involved using the Amflow equipment basically comprises the following sequence of steps:

(i) Preparation of a liquid fermentation brew, referred to in the trade as a liquid sponge. This has a variable composition, but typically is prepared by adding yeast, yeast food, fermentable sugar, salt, milk solids and a proportion, which today is often as much as 50 to 70%, of the total formula flour, to water in a stainless steel blending tank. The resulting mixture is pumped to one of a number of stainless steel holding tanks in which it is held for about 2½ hours at about 85° F. to ferment, and thereby develop, the liquid sponge.

(ii) The matured liquid fermentation brew is then pumped to a usage tank from which it is withdrawn as required, and passed to an incorporator wherein it is continuously admixed in a premixing step with the remainder of the flour, shortening (of critical specification), and an oxidising solution to form a viscous batter. The oxidising solution is typically composed of a mixture of potassium bromate and potassium iodate in a concentration such as to provide between about 40 p.p.m. to 100 p.p.m. potassium bromate and 5 p.p.m. to 30 p.p.m. potassium iodate expressed on a flour weight basis.

(iii) The viscous batter produced in the premixing step in pumped continuously into a developer unit in which it is intensely mixed at high speed to form a dough. The developed dough is deposited directly from the developer into the bread tins, proofed and then baked in a standard oven.

The procedure involved using the Do-Maker equipment is basically similar to that of the Amflow process except that, at most, only a small proportion of the formula flour is incorporated in the liquid fermentation brew so that the overall procedure for preparing the brew is somewhat simplified and, since the fermented brew is less viscous, the pumps involved can be of smaller capacity. The flour is incorporated, along with the fermentation brew, shortening and oxidising solution, at the premixer stage.

Both continuous dough-making processes, therefore, are characterised by the initial formation of a liquid fermentation brew which has been allowed to stand for a period of the order of 2 to 4 hours to ferment, before being continuously combined with flour and other dough ingredients to form a viscous batter which is then pumped through a continuous developer unit wherein it is mixed at high speed in an enclosed system, i.e. there is no exposure to atmospheric air during development, to form a dough. In summary, in both the foregoing procedures, the development of the gluten matrix and characteristic dough properties such as extensibility, elasticity and consistency, are mediated, to a large degree, by the relatively prolonged fermentation period involved in the initial formation of a liquid fermentation brew. The apparent importance of the liquid fermentation brew, especially in its influence on the resultant dough properties, and the need to avoid too short and too long periods of fermentation, are referred to in page 464 of "Bakery Technology and Engineering" (1960), edited by Samuel A. Matz.

This necessity, in continuous dough-making processes as currently practised, for a distinct fermentation period, inheres with significant disadvantages. For instance, a typical commercial bakery based on continuous dough processing in order to maintain continuous production requires some 4 to 6 large stainless steel tanks in which to prepare and hold the brews. This is expensive in terms both of plant and space. The preparation of the liquid fermentation brew requires close attention to pH, temperature and humidity to ensure a satisfactory dough, which involves substantial labor costs. Moreover, in the formation of the liquid fermentation brew there is a loss of 1½ to 2% of the sugar due to its fermentation into alcohol and carbon dioxide. Again, frothing during fermentation with spillage losses can be a problem. Above all, the fermentation period is time-consuming, and significantly adds to the overall processing time, and hence productivity. It also reduces the overall flexibility of the process, which is particularly irksome to the baker when it comes to meeting demands for additional bread on short notice. In the event of a rush order for bread, say, late in the day, such a bakery is faced with the fact that it cannot produce without going through the lengthy procedure of making a liquid fermentation brew.

It is not surprising, therefore, that the desirability of eliminating the need for the initial formation of a liquid fermentation brew in a continuous dough-making process has been recognised by those skilled in the art, and proposals have been made for attaining this end. For instance, U.S. Pat. No. 3,053,666, issued Sept. 11, 1962, to Richard G. Henika and Nelson E. Rodgers, while primarily concerned with the reduction of the preliminary fermentation period in a conventional batch system, also describes the reduction of the fermentation period in a continuous dough-making system. This is accomplished by chemically developing the dough using a mixture of a reducing agent, like L-cysteine hydrochloride, and an oxidising agent such as bromate salts like potassium bromate, desirably in combination with dry powdered whey. In such chemical development, the reducing agent is believed to rapidly condition the protein of the flour by reducing disulfide bonds linking individual protein units of the hydrated gluten elements of the flour. The net effect is to facilitate the subsequent reorientation of the individual protein units which can slide along each other without losing coherence, so that the three-dimensional gluten matrix to entrap the generated carbon dioxide is established. The oxidising agents, such as potassium bromate, are believed to serve to reoxide the reduced disulfide bonds thereby interlocking the gluten matrix and reestablishing the protein system. In such chemical development procedures, as described in the prior art relating to continuous dough-making processes, the cysteine hydrochloride or like reducing agent is usually present in relatively large amounts of between 50 and 100 p.p.m. For instance, the only relevant example (Example 13) in the aforementioned patent specification teaches the use of 80 p.p.m. cysteine hydrochloride in conjunction with a high level (114 p.p.m.) of potassium bromate and potassium iodate as oxidising improvers. However, as shown by H. Jorgensen, General Chemistry, vol. 13, page 346, 1937, the use of reducing agents like cysteine hydrochloride in such relatively large amounts is regarded as detrimental to the baking performance of the flour tending to result in soft, slack, runny doughs often referred to in the trade as "green" doughs. This is reflected in the properties and appearance of the bread baked from such doughs which usually has low volume, poor grain quality, coarse texture and an unappealing aroma and flavor. To a certain extent, the bad effects of such large amounts of cysteine can be ameliorated, as by substantially reducing the water content of the dough formula and by counteracting the delecterious effect of the cysteine by the use of relatively large amounts of oxidant. Thus, in the aforementioned Example 13, the water content of the formula, at 60%, is significantly lower than the 65% customary in commercial continuous dough processes. It will be appreciated that reducing the water content of a formula adversely affects the bread yield, so this is unattractive to the baker operating as he is in a markedly cost conscious industry. Again, in the procedure of Example 13, the oxidant level at 114 p.p.m. is well above the maximum level of 75 p.p.m. permitted under the Federal Food, Drug and Cosmetic Act (cf. the legislation set forth in Section 1, paragraph (a), subparagraph (12)(i) on page 2 of Part 17, Chapter 1, Title 21 entitled, "Bakery Products, Definitions and Standards of Identity," issued under the Federal Food, Drug and Cosmetic Act by the Food and Drug Administration in connection with the Definitions and Standards for Food).

Whatever the explanation, it is a fact that, as applied to continuous dough processes, the use of cysteine/oxidant combinations as chemical developers has not attained any significant commercial acceptance and, at the present time, it is still customary for bakeries operating continuous dough-making processes to prepare, in a time-consuming, inflexible and inconvenient procedure, a liquid fermentation brew involving a distinct fermentation period usually of the order of 2½ hours.

Another significant disadvantage associated with continous dough processes is that the high mixing speeds characteristic of the developer stage demand a correspondingly high work input, and this is reflected in the power consumption, and, in turn, electricity costs, which bear upon the baker's production costs. Further, the mixing speed is directly related to the production rate (as well as the dough composition) and, in a given machine, the higher the mixing speed, i.e. the higher the r.p.m., the greater the throughput. Consequently, by reducing the mixing speed required for optimum dough development it is possible, in a given machine, either to increase the throughput, i.e. production rate, or to reduce the work input and thereby power consumption, i.e. electricity costs. In either event, the baker's cost of production is reduced. Various expedients have been tried to reduce the mixing speed requirement of flour. For instance, U.S. patent specification No. 3,304,183 issued Feb. 14, 1967, to William R. Johnston and Robert E. Mauseth, describes the significant reduction in mixing speed requirements in continuous dough-making processes obtained through the inclusion of ascorbic acid or isoascorbic acid acting as reducing agents.

SUMMARY OF THE INVENTION

Broadly stated, we have now discovered, and this discovery forms the basis of the present invention, that the initial formation of a liquid fermentation brew in a continuous dough-making process can be dispensed with altogether without detracting from the quality of the resulting bread which, indeed, is often superior in quality to that usually produced by the same bakery. This elimination of a distinct fermentation period is attained by incorporating, along with standard dough ingredients, a mixture of selected chemical additives in defined amounts. In combination, these additives provide novel functional effects in a continuous dough system. Thus, in addition to eliminating the need for a liquid fermentation brew, these functional additive combinations significantly reduce, in the developer stage, the mixing speed requirement for optimum dough development. The process of this invention, therefore, has the advantage, among others, of lower operating costs compared to conventional continuous dough-making processes.

Accordingly, therefore, a general object of this invention is to provide an improved continuous dough-making process characterised by the elimination of the need to prepare a liquid fermentation brew.

Another object of this invention is to provide such an improved continuous dough-making process in which the mixing speed requirement of a given flour is substantially reduced through the inclusion of a functional additive combination.

Another object of this invention is to provide a continuous dough-making process which is relatively simple with respect to the number of operations involved, and which inheres with lower operating costs compared to conventional dough-making processes by reducing the overall time, equipment, labor and space required for the complete process, and by providing enhanced flexibility and an increased production rate.

Another object is to provide bakery additive compositions, and activated flours, containing a blend of functional chemical additives in defined amounts which are particularly adapted for use in the improved process to obtain the elimination of the distinct, initial fermentation stage involved in the formation of the liquid fermentation brew, and a reduction in optimum mixing speed requirements in the developer stage.

Another object of the invention is to provide bread and other yeast-leavened products of high quality produced by an improved continuous dough-making process.

Other objects and features of the invention will be apparent from the following description in which reference will be made to the accompanying drawings wherein.

The fulfillment of the foregoing and other related objects is based upon our finding of the novel and advantageous effects obtained by the use in continuous dough-making processes of defined amounts of chemical additives in the form of a combination of an acceptable food grade sulfhydryl (SH)-containing reducing agent such, for example, as L-cysteine hydrochloride or glutathione, an acceptable wood grade antioxidant such, for example, as isoascorbic acid, and an acceptable food grade oxidising improver such, for example, as bromate and/or iodate salts.

The effects deriving from the use of such a combination of chemical additives include the elimination of the need for a liquid brew fermentation step and a significant reduction in the mixing speed required for optimum dough development.

Our invention, therefore, provides a continuous dough-making process in which the baker need not go through the lengthy step of preparing a liquid fermentation brew and can operate the developer at significantly lower mixing speeds, or by operating at a higher mixing speed increase his throughput, and yet produce developed dough and finished bread of equivalent or superior quality to that obtained with a fermentation brew associated with conventional continuous dough-making processes. The elimination of the need for the distinct and lengthy fermentation step provides obvious economies over a conventional continuous dough-making process. Also, the reduction of the mixing speed requirement for optimum dough development is highly advantageous. Thus, the lower the mixing speed requirement, the higher the attainable production rate in a given machine; for instance, a 25% reduction in the optimum mixing speed requirement is sufficient to permit a production rate increase of about 30 to 35%. Alternatively, the production rate may be held constant, in which event, the work input at the developer stage, and hence the power consumption, is substantially reduced by a like amount.

The amounts of each of the functional additives that must be employed in combined use to permit the desired elimination of the fermentation period as well as the reduction in mixing speed requirement, without sacrificing dough and ultimate bread properties, are generally found to be within the following ranges (based on flour content in the dough formula):

|  | P.p.m. |
|---|---|
| Sulfhydryl-containing reducing agent | 3–30 |
| Antioxidant | 30–200 |
| Oxidant | 30–100 |

In its process aspect, therefore, this invention provides an improved continuous dough-making process for making bread and like yeast-leavened products, characterised by the absence of a distinct fermentation step associated with the formation of a liquid fermentation brew and a reduced mixing speed requirement in the developer stage, which comprises forming an aqueous yeast slurry by commingling yeast with water, subsequently admixing this yeast slurry with other standard dough ingredients including flour, shortening, sugar and salt, and, as functional chemical additives, a combination of:

About 3 to about 30 p.p.m., on a flour weight basis, of a food grade sulfhydryl-containing reducing agent;
About 30 to about 200 p.p.m., on a flour weight basis, of an acceptable food grade antioxidant; and about 30 to about 100 p.p.m., on a flour weight basis, of an acceptable food grade oxidising agent;

transferring the viscous batter so-formed to an enclosed, high-speed continuous developer stage, mixing the batter under reduced mixing speed requirements relative to a batter not containing said combination of functional additives in the developer stage, depositing the dough in pans, and proofing and baking the deposited dough to form the products.

DETAILED DESCRIPTION OF THE INVENTION

The sulfhydryl-containing reducing agent is preferably L-cysteine hydrochloride, although other compounds related to or homologous with L-cysteine hydrochloride can be used, such as D- and DL-cysteine hydrochloride. Also, other sulfhydryl-containing compounds such as glutathione and bisulfite salts like sodium bisulfite may be used.

The antioxidant may be a water, oil or fat soluble substance suitable for food applications such, for example, as gallates like propyl gallate, α-tocopherol, butylated hydroxyanisole (BHA), butylated hydroxy toluene (BHT), isoascorbic acid, L-ascorbic acid, ascorbyl palmitate, calcium and sodium ascorbate and the like.

The oxidising agent may be any of the conventional oxidants used in bread production such, for example, as bromate salts like potassium, sodium or calcium bromate, iodate salts such, for example, as potassium iodate or calcium iodate, azodicarbonamide ("Maturox"), ammonium persulfate or acetone peroxide ("Keetox"), or a combination thereof.

Optimum levels for each of the three components of the additive combination will vary depending, for instance, upon flour strength, cost considerations, actual procedure involved, the nature and level of the other components and the nature and quality of the bread sought. However, the preferred ranges are usually within the following limits, again based on content of flour used in the formula:

|  | P.p.m. |
|---|---|
| Sulfhydryl-containing reducing agent | 10–20 |
| Antioxidant | 50–100 |
| Oxidant | 40–75 |

As mentioned hereinbefore, the sulfhydryl-containing reducing agents like cysteine hydrochloride are well-recognised as functional additives in breadmaking serving to reduce the mixing speed requirements of a dough. Moreover, the prior art, for example, the aforementioned U.S.

patent to Henika and Rodgers, also teaches that such reducing agents in combination with conventional oxidants may be used in a continuous process to reduce the fermentation time involved in the preparation of the liquid fermentation brew. For instance, in the continuous process described in Example 13 therein, 80 p.p.m. L-cysteine hydrochloride and 114 p.p.m. potassium bromate/iodate as oxidising improver were used, and the brew time, whilst not entirely eliminated, was reduced to 25 minutes. However, according to prior art teaching, the desired effects associated with the incorporation of a reducing agent in a dough, either alone or in combination with an oxidant, are elicited only when the cysteine hydrochloride is present at levels markedly higher than the 30 p.p.m. upper limit required in the process of this invention. And, as is well known, such large amounts of cysteine, especially when tthe dough is subjected to vigorous mixing, as in a continuous dough-making process, usually would be expected to be detrimental to the baking performance adversely affecting bread volume, grain and texture, and generally resulting in a poor quality loaf. For these reasons, and also because of difficulties in controlling the effect of its reducing action during mixing and proofing time, L-cysteine hydrochloride has not hitherto attained general acceptance as a bread improver. If, in the process of our invention, the L-cysteine hydrochloride is present in amounts higher than about 30 p.p.m., the dough, as would be expected from the prior art teaching, has poor mixing tolerance, i.e. slight deviations from the optimum have bad effects on dough quality, and the bread is of poor quality having an unacceptable low volume, poor grain quality, (open grain with large vesicles and thick cell walls) and harsh texture. However, when the L-cysteine hydrochloride is used at the 30 p.p.m. level or less, preferably at or less than 20 p.p.m., which is substantially below levels customarily used in prior practice, together with defined amounts of an antioxidant and an oxidant, we obtain a loaf of good quality in the complete absence of any prior-formed liquid fermentation brew.

With regard to the antioxidant component of the additive combination, ascorbic acid, which is a suitable antioxidant for use in our process, has long been recognised as a flour and bread improver for conventional, i.e. non-continuous, bread processes, in which systems it is generally agreed today that its effect is oxidative in character through dehydroascorbic acid which is produced in doughs from ascorbic acid by enzymic oxidation.

More recently, the above-mentioned U.S. patent to Johnston and Mauseth, describes the action of ascorbic acid and isoascorbic acid in reducing the mixing speed requirements in a continuous dough-making process. It is generally agreed today that the mode of action of ascorbic acid in continuous dough systems is quite different to its action in conventional bread processes, and it is currently believed that ascorbic acid functions as a reducing agent in such continuous processes. The possibility of using antioxidants, of which ascorbic acid is only one of a number of suitable compounds, in combination with sulfhydryl-containing reducing agents at lower levels than hitherto used, and oxidising improvers, to completely eliminate the need for a fermentation brew in continuous dough-making processes, and also reduce the mixing speed requirement, has not previously been described. This is the principal novel and unexpected feature of our invention, and appears to be due to an interaction between compounds like ascorbic acid that have the ability to function as antioxidants in continuous dough-making processes and the reducing agent component like L-cysteine hydrochloride. Thus, when the antioxidant component in the combinations is replaced by common reducing agents such as, for example, ferrous and stannous salts and thiosulfates, the process produces bread having inferior internal characteristics and generally of low quality.

The chemistry underlying the role of the antioxidant in our process is imperfectly understood at the present time, but the following explanation is offered as being consistent with currently known facts.

The antioxidant is believed to perform two distinct, but interrelated, functions through one type of chemical reaction. Thus, it is thought to maximise the effective action of the reducing agent, say, L-cysteine hydrochloride, by blocking the action of fast-acting oxidants during the developer stage, thereby facilitating and extending the effect of the reducing agent in rupturing the disulfide bonds prior to the reorientation and formation of the desired, three-dimensional gluten matrix. More specifically, the antioxidants are envisaged as reacting with the oxygen entrapped in the dough mixture at the premixer stage, and carried through in the dough to the developer stage. It is known that oxygen present in the dough interacts with flour components during the development stage, yielding reaction products which hinder and deleteriously affect dough development. Accordingly, the preferential oxidation of the antioxidants through reaction with the entrapped oxygen, effectively inactivates the molecular oxygen, thereby protecting the other dough ingredients. In this way, proper dough development can be accomplished with much less reduction, so that the reducing agent may be used at substantially lower levels than customary in the prior art, whilst still rupturing an adequate number of disulfide bonds for subsequent reorientation, and reformation into the gluten matrix.

Moreover, the antioxidants in their own right are found to substantially lower the mixing speed requirement for optium dough development, probably by the same mechanism. In this regard, the antioxidants serve to reinforce the effect of the sulfhydryl-containing reducing agent, so that the optimum mixing speed requirement is lower than that resulting from the presence of the reducing agent in conjunction with oxidant. Some preliminary evidence suggests that in reducing the mixing speed requirements, the effects of the reducing agent and the antioxidant may be synergistic in character.

With regard to the oxidants, the levels used are the same as those customarily employed in continuous dough-making processes. In setting the limits of the oxidant incorporated in the dough mixture, whether in the form of the prepared composition or otherwise, allowance may have to be made for any oxidant introduced during the milling of the flour or along with the yeast food. Preferably, the oxidant comprises a blend of a slow-acting oxidising agent like potassium bromate, and a fast-acting oxidant like potassium iodate, and advantageously the oxidant is a mixture of between 40 to 60 p.p.m. potassium bromate and 10 to 20 p.p.m. potassium iodate.

In certain instances, it has been found advantageous to coat or encapsulate the oxidant with an effect-delaying material thereby insuring that the action of the oxidising agent improver is delayed until the protective coating is dissipated. In this way, the reducing agent is protected from the antagonistic action of the oxidant so that it can function more effectively in rupturing the disulfide bonds. Suitable coating or encapsulating materials include glyceryl monostearates, acetylated monoglycerides like those commercially available under the trade name "Myvacet," gelatin, carboxymethyl cellulose, aluminum tristearate, polyvinylpyrollidone, sodium caseinate or vegetable gum. The coating may be applied to the oxidising agents in any conventional manner, such, for example, as by pan coating.

Although not essential, it is convenient to blend the functional additives with the standard dough ingredients by introducing them in the form of a prepared bakery additive composition comprising the three sorts of functional additive and a non-toxic carrier. Accordingly, therefore, this invention in a composition of matter aspect, provides a prepared bakery additive composition for use in a continuous dough-making process characterised by the absence of a distinct fermentation step involved in the formation of a liquid fermentation brew and reduced mixing speed requirements in the developer stage, said composition being in the form of a dry mix comprising a non-toxic carrier and, intimately blended therewith, as functional chemical additives, a combination of:

0.05 to 1.2% by weight, based on the weight of the composition, of a good-grade sulfhydryl-containing reducing agent;
0.2 to 4.8% by weight, based on the weight of the composition, of a food-grade antioxidant; and
0.24 to 5.7% by weight, based on the weight of the composition, of a food-grade oxidising agent.

The carrier forming the basis of such compositions should be a free-flowing, powdered substance. The preferred carrier is wheat or corn starch, but other materials such as, for example, powdered dextrose, flour, sodium chloride, calcium sulfate, calcium carbonate or mixtures thereof, may be used. The composition may include other functional additives such as, for example, a yeast food like ammonium sulfate or ammonium phosphate or an anticaking agent like tricalcium phosphate.

A preferred composition according to this invention comprises:

| Ingredient: | Content (weight percent) |
| --- | --- |
| Starch | 92.54–73.15 |
| L-cysteine hydrochloride or like sulfhydryl-containing reducing agent | 0.15–0.60 |
| Isoascorbic acid or like antioxidant | 0.60–2.40 |
| Potassium bromate | 0.60–2.40 |
| Potassium iodate | 0.11–0.45 |
| Ammonium sulfate (yeast food) | 5.00–20.00 |
| Tricalcium phosphate (anti-caking agent) | 1.00–1.00 |

Preferably, the various components of the compositions are present in the form of very fine, dry particles which facilitate the uniform incorporation of the composition with the standard dough ingredients. Advantageously, the average particle size does not exceed 250 microns (60 mesh U.S. Standard Sieve Series).

The compositions are prepared by mixing the various components thereof, in powdered form, until a homogeneous blend is obtained. To minimise interaction between functional additives, especially the antioxidant and oxidant components, that might impair their activities, it may be desirable to separately intermix some or all of the functional additives with the carrier. For instance, the oxidising agent can be first mixed with the carrier, then the reducing agent added and mixed in, and thereafter the antioxidant added, and the whole mixed together to give a uniform blend. Alternatively, each of the functional additives can be separately blended with different portions of the powdered carrier, and the different blends subsequently combined. In this way, the different functional additives are dispersed throughout the composition, and physically separated by carrier particles. The possibility of harmful interactions between functional additives can also be lessened by coating the oxidant component.

The prepared composition described above, in which a carrier such as starch serves as a vehicle to facilitate the homogeneous incorporation of the functional additives, is particularly well adapted to, and convenient for, the bakery trade. Thus, such a composition provides the baker with a product in which the functional additives are combined together in appropriate, predetermined proportions and overall level, so that the baker can readily determine, in any instance, the amount of the composition that should be included along with the standard dough ingredients. In this way, the baker is saved from the inconvenience and trouble of making complex adjustments to the levels and proportions of the different functional additives.

As previously mentioned, the optimum levels of the three functional additives, especially the oxidant component, vary in accordance with the flour strength, actual procedure and type of equipment, nature and level of the other functional additives, and the nature and quality of the product desired. The baker can readily adjust the amounts of functional additives by adding more or less of the prepared composition containing the functional additives. For example, say, the composition contains 0.4% by weight L-cysteine hydrochloride, 1.6% by weight isoascorbic acid, 1.6% by weight potassium bromate and 0.3% by weight potassium iodate, as functional additives, then, when incorporated with the standard dough ingredients in an amount equal to 0.375% by weight of the total flour in the formula (6 ounces per 100 lbs. formula flour), it will provide 15 p.p.m. cysteine hydrochloride, 60 p.p.m. isoascorbic acid, 60 p.p.m. potassium bromate and 10 p.p.m. potassium iodate in the dough mixture. Varying the level of such a composition to compensate for variables like flour strength, in a range of from 0.076 to about 0.75% by weight, based on formula flour weight, provides levels of between 3 to 30 p.p.m. L-cysteine hydrochloride, 12 to 120 p.p.m. isoascorbic acid, 12 to 120 p.p.m. potassium bromate and 2 to 20 p.p.m. potassium iodate.

The functional additives may be incorporated into the dough mixture in a form other than a prepared bakery additive composition. For instance, the three sorts of functional additives may be included separately in the dough mixture. For instance, it may be convenient to incorporate the oxidising agent in the form of a solution that is pumped intno the incorporator, while feeding the reducing agent and antioxidant, either separately or in combination, into the incorporator, in the form of fine, dry powders. Again, the functional additives may be preblended, at the desired levels, in the flour intended for use in the process. This procedure ensures very thorough and uniform dispersion of the functional additives in the subsequent dough mixture and, by dispersing them throughout the flour, dilutes them, thereby avoiding concentrated blends; hence, the possibility of additive interactions is minimised. Accordingly, this invention, in another of its composition of matter aspects, provides an activated flour for use in a continuous dough process characterised by the absence of a distinct fermentation step involved in the formation of a liquid fermentation brew and reduced mixing speed requirement in the developer stage, comprising an intimate blend of dry flour, and, as functional chemical additives, a combination of:

about 3 to about 30 p.p.m., on a flour weight basis, of a food grade sulfhydryl-containing reducing agent in powdered form;
about 30 to about 200 p.p.m., on a flour weight basis, of a food grade antioxidant in powdered form; and
about 30 to about 100 p.p.m., on a flour weight basis, of a food grade oxidising agent in powdered form.

In commercial practise, the process of this invention is generally carried out in the following way:

(i) In an initial step, the baker, at the beginning of each production day or shift makes up a master batch aqueous yeast slurry, conveniently in an amount sufficient to meet the estimated requirement for the whole day or shift. This slurry is prepared simply by gently agitating the yeast cells with water, preferably in the absence of other dough formula ingredients. If desired, however, the slurry may include a small amount, typically 5 to 10%, of the total sugar in the particular dough formula, the formula salt and a mould inhibitor such as, for example, calcium propionate. In the formation of the yeast slurry, the yeast, for example, in the common compressed or active dry form, is admixed with all or substantially all the formula water, typically in a stainless steel tank fitted with an agitator and a thermometer to permit accurate control of the temperature. Usually there is no need to heat the slurry, and water straight from the baker's regular supply is generally perfectly satisfactory. Ordinarily, this supply water is at temperature below ambient temperature, and between about 35° and about 60° F. In certain instances, for example, with a very sluggish yeast, it may be desirable to heat the slurry at a temperature of around 80° F. for a brief period, say, 10 to 20 minutes, to activate or condition the yeast cells, thereby preparing them for subsequent fermentation involving the brisk evolution of carbon dioxide. Generally, however, such heating is unnecessary, and is best avoided.

The aqueous yeast slurry is stored below about 60° F., if need be by chilling, and withdrawn as required. Chilling of the slurry, usually to between about 40° and 55° F., is advantageous in repressing the gas producing activity of the yeast cells, and thereby maintaining the properties of the slurry uniform during the storage period, and hence is preferred. The chilling may be effected in a number of ways as, for instance, by the addition of a measured quantity of ice or iced water, or by the use of refrigeration equipment or conventional heat exchangers.

The aqueous yeast slurry so-formed is very stable since the initiation of the fermentation reactions associated with yeast cells when heated at over about 80° F. for a sufficient period is substantially avoided. Such an aqueous yeast slurry is markedly different from, and superior to, a liquid fermentation brew which, because of continuing and, in certain respects, uncontrollable fermentation reactions, is highly unstable and needs to be used more or less directly after its formation. The chilled aqueous yeast slurry, on the other hand, may be stored for relatively long periods, say, for 24 hours or longer, without any material change in properties or character. Moreover, quite unexpectedly, the fermentative power of the yeast is not deleteriously affected, so that when the chilled aqueous yeast slurry is incorporated into a dough mix in a conventional fashion, a high and uniform gassing rate is quickly attained, and there is essentially no change in the leavening effect, as reflected in dough and bread properties.

(ii) The aqueous yeast slurry is pumped at a predetermined rate into an incorporator in which it is blended, in a premixing step, with the other standard dough ingredients and appropriate amounts, within the limits given hereinabove, of the three sorts of functional additives.

The use in this stage of a stable aqueous yeast slurry with substantially constant properties throughout a production run, is advantageous in providing nearly constant fermentative action and, therefore, a nearly uniform effect on dough development. Also, the use of a stable aqueous yeast slurry in conjunction with the defined functional additives serving to mature and condition the dough biochemically, permits uniform dough leavening to be achieved without the necessity for reliance upon prolonged, difficultly controllable fermentation reactions. Both effects permit the attainment of greater uniformity of bread.

(iii) The thick batter so-obtained is pumped into the developer unit wherein it is mixed at high speed for a short period. The developed dough is deposited directly from the developer into pans, proofed, usually for a period varying between about 40 and about 80 minutes, and then baked in a standard oven.

Conveniently, the functional additives are blended with the dough ingredients by feeding into the incorporator a prepared bakery additive composition according to this invention. In this event, the composition is added in an amount calculated to contribute the desired levels of the three sorts of functional additives allowing, if need be, for any oxidant such as potassium bromate that may be contained in the flour or which may be included in the yeast food. Alternatively, the three sorts of functional additives may be separately introduced into the incorporator. Another possibility is that they may be included in an activated flour obtained by preblending the formula flour with the functional additives.

The standard dough ingredients referred to consist of the usual ingredients employed in making yeast-raised doughs, namely, flour, sugar, salt, shortening, dry milk solids, e.g. skim milk, and water. Other conventional additives such as non-diastatic malt syrup, cracked wheat, glycerides and alkali propionates such as calcium propionate may be included depending on the bread type. The quantity of each ingredient to be added varies with the type of dough being made.

Essentially, all types of wheat flour have been found suitable for the preparation of yeast-leavened products by the improved continuous dough-making process of this invention. Thus, normal "white" flour obtained from conventional flour milling procedures and suitable for conventional continuous dough-making processes may all be used in the process of this invention.

PREFERRED EMBODIMENTS OF THE INVENTION

The following illustrative examples, some of which are comparative in nature, are given by way of facilitating a more comprehensive understanding of this invention, and to demonstrate the advances afforded over continuous dough-making processes as presently practised.

In Examples 1 to 7 hereinafter, the continuous processing machinery, the dough formula, the basic "no-brew" procedure and the testing methods employed were as follows:

(i) Machinery

The machine used was a pilot plant Amflow model. This was a small scale version, specially adapted for experimental investigations, of the larger commercial machine, and consumed 100 lbs. flour per hour to produce 180 lbs. dough per hour.

(ii) Continuous dough formula

TABLE I

| Ingredient: | Percent flour (wt. basis) |
|---|---|
| Flour [1] | 100 |
| Water | 66–70 |
| Yeast | 3 |
| Sugar | 7 |
| Salt | 2 |
| Milk | 1 |
| Liquid shortening (PG 7N) | 3.3 |
| Ammonium sulfate (yeast food) | 0.08 |
| Calcium acid phosphate | 0.4 |
| Atmul (softener) | 0.1 |
| Functional additives [2] | Variable |

[1] The flour used was an I-H flour (Kansas City)—commercially milled from hard red spring wheat, of the following specification:

| Moisture content | percent | 13.8 |
| Protein content | do | 11.52 |
| Ash | do | 0.44 |
| Gassing power | mm. Hg | 530 |
| Faringograph: | | |
| Arrival time | minutes | 1.5 |
| Peak time | do | 7.5 |
| Departure time | do | 15.0 |

[2] When practising the "no-brew" process of the invention with a functional additive combination as described hereinabove, the additives were preblended at the desired levels with the formula flour. The oxidant component of the functional additive combination was coated with "Myvacet" (an acetylated monoglyceride available from Distillation Products Industries, Eastman Kodak). The "Myvacet," in an amount equal to 3 weight percent of the weight of oxidant to be coated was dissolved in ethanol. This solution was then added to the oxidant, in finely divided powder form, in a revolving coating pan to deposit a "Myvacet" coating on the particles. The particles were then dried and sieved through a 60 mesh screen.

(iii) "No-Brew" procedure

An aqueous yeast slurry was formed by gently stirring compressed yeast for about 10 minutes with 85% of the total formula water in a stainless steel tank fitted with a paddle agitator. The water was taken direct from the regular bakery supply at a temperature of 55° F., which is well below the yeast fermentation temperature (about 80° to 85° F.). The aqueous yeast slurry so-formed was chilled to 50° F. by means of in situ refrigeration coils, and stored at this temperature, with continuous gentle agitation, and withdrawn as required. The slurry was very stable, and could be held for periods of 30 hours or longer. Its properties remained constant during storage.

The various dough ingredients were introduced into the incorporator of the Amflow machine through four feed lines each equipped with a metering pump. The chilled aqueous yeast slurry was metered into the incorporator at a rate of 275 gms. per 36 seconds through one such feed line fitted with a heat exchanger so that the chilled slurry was heated in passing to the incorporator. A nutrient solution containing the salt, milk, yeast food, sugar, calcium acid phosphate, calcium propionate, Atmul and the remainder of the water was introduced through another feed line at a rate of 91 gms. per 36 seconds. The liquid shortening was fed through another line at a rate of 15 gms. per 36 seconds, while the flour, containing the functional additive combination, was fed through a fourth feed line at a rate of 454 gms. per 36 seconds. Total feed rate was 835 gms. per 36 seconds. From the incorporator, the viscous batter was pumped into the high-speed developer of the Amflow machine. After a brief (around 90 seconds) residence time therein, the developed dough was extruded into tared pans and the dough cutter, operating at 23 second intervals, regulated to deposit 18½ ounces of extruded dough into the pans, which were then weighed, proofed for 70 minutes and baked for 18 minutes at 450° F.

(iv) Testing methods (a) Work input and developer r.p.m.: The amount of power used in mixing the dough in the developer, i.e. the work input, was continuously shown by means of a recording wattmeter. Likewise, the developer speed in r.p.m. was continuously recorded. As is customary, the r.p.m. was adjusted for each run by a skilled and experienced operator until optimum dough development was obtained.

(b) Dough character: The acceptability of the dough emerging from the developer was assessed by a skilled and experienced operator both visually and tactually, as is customary.

(c) Baking results: On the morning of the day following its preparation, the volume of each loaf was measured by rapeseed displacement, and the loaves were judged. Both internal and external characteristics were observed and rated according to the standard procedure set forth in "Bread Score Report" of The American Institute of Baking. The total score (maximum of 100) is the sum of the scores for internal and external characteristics. Using the same scoring procedure, commercially acceptable breads have a total score in the range 88 to 94. Specific volume was calculated by dividing bread volume in cubic centimeters by dough weight in grams.

EXAMPLE 1

This example illustrates the good results obtained using the functional additive combination of this invention.

Part A—Comparative experiment

Standard brew procedure: Dough was produced continuously by the above described Amflow machine from the basic formula shown in which the water content was 66%, using a standard 2½ hour brew procedure as follows:

(i) A fermentation brew was formed by mixing together in a stainless steel brew tank, 50% of the formula flour, 85% of the total water, the yeast, the ammonium sulfate, the calcium acid phosphate, 12% of the total salt, 7% of the total sugar, the calcium propionate and the Atmul. The liquid brew was set aside for 2½ hours at 85° F. to ferment, at the end of which period there was a brisk evolution of gas from the yeast cells.

(ii) The liquid fermentation brew; a nutrient solution containing the remainder of the water, sugar and salt, as well as the milk and an oxidant solution; the balance of the flour; and the liquid shortening were separately fed into the incorporator wherein they were blended together. The oxidant used was a mixture of potassium bromate and potassium iodate at levels, based on flour weight, of 60 p.p.m. and 10 p.p.m. respectively.

(iii) The viscous batter produced in Step (ii) was pumped into the developer wherein it was mixed at high speed to form a dough which was then proofed and baked as in the "no-brew" procedure.

Part B—Comparative experiment

"No-Brew" procedure: Dough was produced continuously by the above-described Amflow machine from the basic formula shown, in which the water content was 66% and the sole functional additive was oxidant, using the "no-brew" procedure. The oxidant comprised a mixture of potassium bromate and potassium iodate, at levels, based on total flour weight, of 60 p.p.m. and 10 p.p.m. respectively, preblended with the formula flour. The dough so-obtained was proofed and baked as described above.

Part C—Comparative experiment

"No-Brew" procedure: Dough was produced continuously by the above-described Amflow machine from the basic formula shown, in which the water content was 66% and L-cysteine hydrochloride and oxidant were present as functional additives, using the "no-brew" procedure. The L-cysteine hydrochloride was present at a level of 80 p.p.m. based on total flour weight. The oxidant comprised a mixture of finely divided potassium bromate and potassium iodate at levels, based on total flour weight, of 60 p.p.m. and 10 p.p.m. respectively. The functional additives were preblended with the flour prior to its introduction into the incorporator. The dough so-obtained was proofed and baked as described above.

Part D—Comparative experiment

"No-Brew" procedure: Dough was produced continuously by the above-described Anflow machine from the basic formula shown, in which the water content was 66% and isoascorbic acid and oxidant were present as functional additives, using the "no-brew" procedure. The isoascorbic acid was present at a level of 60 p.p.m. based on total flour weight. The oxidant comprised a mixture of finely divided potassium bromate and potassium iodate, at levels, based on total flour weight, of 60 p.p.m. and 10 p.p.m. respectively. The functional additives were preblended with the flour prior to its introduction into the incorporator. The dough so-obtained was proofed and baked as described above.

Part E—Invention

"No-Brew" procedure: Dough was produced continuously by the above-described Amflow machine from the basic formula shown, using the basic "no-brew" procedure. In this instance, the formula included 68% water and a functional additive combination in accordance with this invention comprising:

| | P.p.m. (based on flour wt.) |
|---|---|
| L-cysteine hydrochloride | 15 |
| Isoascorbic acid | 60 |
| Oxidant: | |
| Potassium bromate | 60 |
| Potassium iodate | 10 |

The dough so-obtained was proofed and baked as described above.

Results

Dough and bread properties for each of Parts A to E are summarised in Table II which follows:

quality bread and lowered mixing speed requirements in the developer stage.

TABLE II

| Property | Part A | Part B | Part C | Part D | Part E |
|---|---|---|---|---|---|
| Optimum mixing speed (r.p.m.) | 185 | 230 | 160 | 210 | 150 |
| Dough characteristics | Soft; not sticky. Good mixing tolerance. Good extensibility, and physical characteristics. | Slightly stiff and inelastic. Good mixing tolerance. Moderate extensibility and physical characteristics. | Soft; sticky—a green dough. Poor mixing tolerance. Very poor extensibility, and physical characteristics. | Slightly stiff and inelastic. Moderate extensibility and physical properties. | Soft; not sticky. Good mixing tolerance. Good extensibility and physical characteristics. |
| Specific volume (cc./gm.) | 5.6 | 5.4 | 5.0 | 5.3 | 5.8 |
| Total bread score | 91 | 84 | 77 | 86 | 92 |
| Bread characteristics | Excellent quality. Close and uniform grain; fine, velvety texture. | Marginal quality. Reduced volume. Coarse grain with irregular vesicles and thick cell walls; harsh texture. | Poor quality. Unacceptable commercially. Low volume and irregular shape. Very coarse, open grain; harsh texture. | Acceptable quality. Moderate volume Slightly open grain; soft texture. | Excellent quality. Symmetrical. Close and uniform grain with fine cell walls; fine velvety texture. Better flavor and aroma than Part A with stronger sidewalls and less shrinkage. |

Conclusions

The results indicate that with a dough formula containing the functional additive combination (Part E), the "no-brew" procedure gave bread that was overall similar and, in certain respects, superior in quality to that produced by a standard continuous dough process involving a 2½ hour fermentation brew, with a lower optimum mixing speed requirement in the developer stage. The higher water absorption (68%) afforded by the dough formula of Part E containing the functional additive combination, compared to the dough formula of Part A (66% water absorption) increased the yield by about 2%, which is highly advantageous for the baker. The "no-brew" bread of Part E had superior flavor and aroma and stronger sidewalls.

The bread obtained from the dough formula containing only oxidants (Part B) or oxidants and antioxidants (Part D) was inferior in quality to that of Part E, and the optimum mixing speed requirement was markedly higher. The bread obtained from the dough formula containing L-cysteine hydrochloride and oxidant (Part C), was of very poor quality, and would be unacceptable commercially.

Summarising the results, only with the dough formula of Part E in which the functional additive combination is present, does the "no-brew" procedure give a good

EXAMPLE 2

This example illustrates the advantages resulting from the presence of the antioxidant component in the functional additive combination of this invention.

Part A

In a series of eight separate runs, dough was continuously produced by the Amflow machine from the basic dough formula shown, in which the water content was 66%, using the "no-brew" procedure. In one run, the dough formula contained only oxidant as functional additive and, in the other runs of the series, the dough formula contained oxidant and incremental amounts (between 3 and 100 p.p.m. based on flour weight) of L-cysteine hydrochloride. In all runs, the oxidant was a combination of potassium bromate and potassium iodate at levels, based on total flour weight, of 60 and 10 p.p.m. respectively. The doughs were proofed and baked as described above.

Part B

Each of the eight runs of Part A was repeated exactly, except that in each instance the dough formula included 60 p.p.m., based on total flour weight, isoascorbic acid as an antioxidant.

Results

The results are summarised in Table III which follows:

TABLE III

| Property | L-cysteine hydrochloride | | | | | | | |
|---|---|---|---|---|---|---|---|---|
| | 0 p.p.m. | 3 p.p.m. | 10 p.p.m. | 15 p.p.m. | 30 p.p.m. | 50 p.p.m. | 80 p.p.m. | 100 p.p.m. |
| Optimum mixing speed (r.p.m.): | | | | | | | | |
| Part A | 240 | 230 | 215 | 210 | 200 | 170 | 150 | 100 |
| Part B | 215 | 200 | 150 | 140 | 125 | 120 | 110 | 105 |
| Dough properties: | | | | | | | | |
| Part A | Stiff and inelastic. Poor extensibility and physical characteristics. | Stiff and glossy. Poor extensibility and physical characteristics. Poor mixing tolerance. | Slightly soft; not sticky. Moderate extensibility and physical characteristics. Poor mixing tolerance. | Slightly soft; not sticky. Moderate extensibility and physical characteristics. Poor mixing tolerance. | Slightly soft; not sticky. Moderate extensibility Poor mixing tolerance. | Moderately good dough. Soft; slightly sticky. Moderate extensibility, physical characteristics and mixing tolerance. | Soft and sticky. Very extensible. Reduced water absorption. Poor mixing tolerance. | Very soft; wet and sticky. A green dough. Reduced water absorption. No mixing tolerance. |
| Part B | Slightly stiff and inelastic; not sticky. Moderate extensibility and physical characteristics. | Soft; dry and not sticky. Good extensibility and physical characteristics. Holds more water than the comparable loaf of Part A. | Soft; dry and not sticky. Similar appearance and feel to a 2½ hour fermentation brew dough with 75% flour. Good mixing tolerance. | A very good dough. Soft; but still dry and not sticky. More extensible. Excellent mixing tolerance. Holds more water than the 10 p.p.m. dough. | Soft; not sticky. Good extensibility. Good mixing tolerance. Holds more water than comparable loaf of Part A. | Soft dough; slightly sticky. Cool to the touch but behaved like a warm dough. Very extensible. Reduced water absorption. | Very soft dough; sticky. Very extensible. Reduced water absorption. Poor mixing tolerance and physical characteristics. | Very soft and runny; sticky—a green dough. Reduced water absorption. |

TABLE III.—Continued

| Property | L-cysteine hydrochloride | | | | | | | |
|---|---|---|---|---|---|---|---|---|
| | 0 p.p.m. | 3 p.p.m. | 10 p.p.m. | 15 p.p.m. | 30 p.p.m. | 50 p.p.m. | 80 p.p.m. | 100 p.p.m. |
| Specific volume (cc./gm.): | | | | | | | | |
| Part A | 5.3 | 5.3 | 5.2 | 5.2 | 5.3 | 5.1 | 5.0 | 5.0 |
| Part B | 5.4 | 5.6 | 5.7 | 5.8 | 5.6 | 5.4 | 5.1 | 5.0 |
| Total bread score: | | | | | | | | |
| Part A | 83 | 83 | 81 | 82 | 83 | 85 | 79 | 75 |
| Part B | 86 | 88 | 90 | 92 | 90 | 84 | 81 | 75 |
| Bread characteristics: | | | | | | | | |
| Part A | Unacceptable quality bread. Poor volume. Coarse open grain; harsh texture. | Unacceptable quality bread. Poor volume. Coarse open grain with thick cell walls; harsh texture. | Inferior quality bread. Poor volume. Coarse open grain; harsh texture. | Inferior quality bread. Poor volume. Coarse open grain; harsh texture. | Poor quality bread. Poor volume. Coarse open grain; harsh texture. | Acceptable quality bread through an off-flavor was noticeable and grain slightly coarse and open. | Unacceptable quality bread. Poor volume and noticeable off-flavor. Coarse open grain; harsh texture. Unsymmetrical. | Unacceptable quality bread. Low volume. Very coarse open grain; very coarse texture. Noticeable off-flavor. |
| Part B | Good quality bread. Only moderate volume. Slightly open grain. | Very good bread. Good volume. Fine uniform grain; soft texture. | Very good bread. Comparable quality to standard 2½ hour fermentation brew bread. Fine uniform grain. Soft velvety texture. | Excellent bread. Superior in quality to standard 2½ hour fermentation brew bread. Fine uniform grain. Soft velvety texture. Appealing flavor and aroma. | Good bread. Uniform grain with fine cell walls; soft texture. | Barely acceptable quality bread. Lower volume than 30 p.p.m. Open grain with fine cell walls. | Unacceptable quality bread. Poor volume. Open grain with thick cell walls; harsh texture. | Unacceptable quality bread. Poor volume. Very coarse open grain; coarse texture. |

Conclusions

On comparing the data obtained from Parts A and B of this example, it will be noted that the inclusion of 60 p.p.m. isoascorbic acid as antioxidant in the dough formula (Part B) resulted in:

(1) Markedly superior bread quality at all levels of cysteine hydrochloride up to 30 p.p.m.
(2) Significant reduction in optimum mixing speed requirements, especially at levels of cysteine hydrochloride up to 30 p.p.m. Since the production rate was held constant, this reduction in optimum mixing speed requirement was reflected in a decrease in the work input, i.e. power requirements were lower, so saving on electricity costs.
(3) Enhanced water absorption, which gave superior yields.

In both series, at cysteine hydrochloride levels above 30 p.p.m., the dough became increasingly intolerant to mixing speed variations—this was particularly marked in Part A wherein very poor dough stability was noted.

Figure 1:
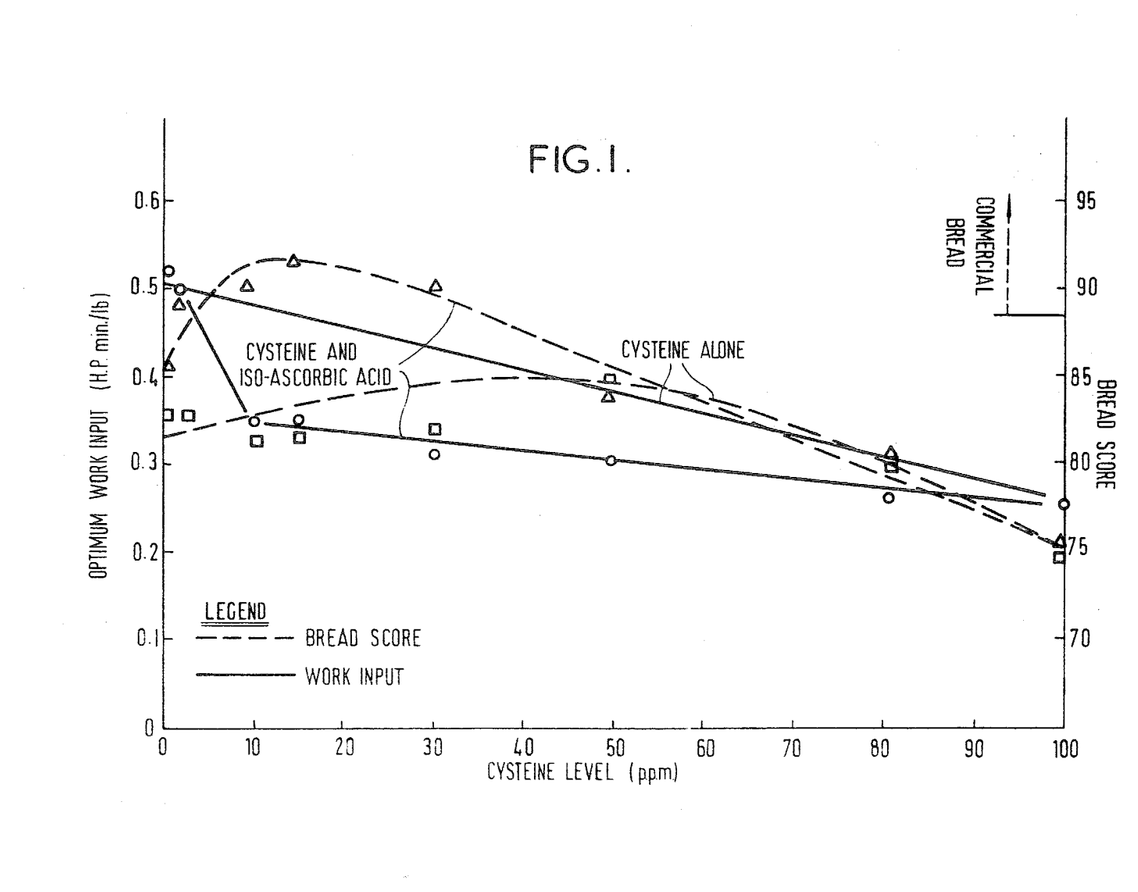
FIGS. 1 to 3 are graphs illustrating certain features of the results obtained practising the procedures described in Examples 2 to 4 hereinafter.

The advantageous results, in terms of reduced work input and better quality bread, resulting from the dough formulae of Part B containing a functional additive combination according to this invention (in which the antioxidant is isoascorbic acid), are illustrated in the graph shown as FIG. 1 of the accompanying drawings. In this graph, the calculated work input and total bread scores obtained with the runs of Parts A and B are plotted against increasing cysteine hydrochloride content. From the graph, it can be seen that the combination of good bread quality and reduced work input, is obtained only with the dough formula of Part B including the functional additive combination containing between 3 and 30 p.p.m. cysteine hydrochloride, with an optimum at 10 to 15 p.p.m.

EXAMPLE 3

This example illustrates the effects of varying the level of antioxidant component, in this instance, isoascorbic acid, in the functional additive combination of this invention.

In a series of six separate runs, dough was continuously produced by the Amflow machine from the basic formula shown, using the "no-brew" procedure. In this instance, the formula included 68% water and a functional additive combination comprising:

|  | P.p.m. (based on flour wt.) |
|---|---|
| L-cysteine hydrochloride | 15 |
| Isoascorbic acid (incremental amounts) | 0–200 |
| Oxidant: | |
| Potassium bromate | 60 |
| Potassium iodate | 10 |

The doughs so-obtained were proofed and baked as described above.

Results

The results are summarised in Table IV which follows:

TABLE IV

| Property | Isoascorbic acid | | | | | |
|---|---|---|---|---|---|---|
| | 0 p.p.m. | 10 p.p.m. | 30 p.p.m. | 60 p.p.m. | 100 p.p.m. | 200 p.p.m. |
| Optimum mixing speed (r.p.m.) | 210 | 200 | 190 | 160 | 150 | 150 |
| Dough characteristics | Slightly soft; not sticky. Moderate extensibility and physical characteristics. Poor mixing tolerance. | Fairly soft; not sticky. Moderate extensibility and physical characteristics. | Soft; not sticky. Good extensibility and physical characteristics. | Soft; not sticky. Good extensibility and physical characteristics. | Soft; not sticky. Good extensibility and physical characteristics. | Soft, and flowy; a little wet and sticky. Moderate extensibility and physical characteristics. Poor mixing tolerance. |
| Total bread score | 84 | 88 | 89 | 92 | 90 | 88 |
| Bread characteristics | Inferior quality bread. Poor volume. Coarse open grain; harsh texture. Unsymmetrical. | Acceptable quality bread. Good volume. Uniform grain, slightly thick cell walls; soft texture. | Good quality bread. Good volume. Fine uniform grain with thin cell walls; soft velvety texture. | Excellent quality bread. Fine uniform grain with thin cell walls; soft velvety texture. Best loaf of the series. | Good quality bread. High volume. Fine uniform grain with thin cell walls; soft velvety texture. Not so good as 60 p.p.m. loaf. | Acceptable quality. Moderate volume. Less fine grain; soft texture. Slightly ragged crust. |

Conclusions

The results reported in Table IV above indicate a definite effect on bread quality and mixing speed requirements inhering with the inclusion of isoascorbic acid, as the antioxidant component, in the functional additive combination. However, variations in the isoascorbic acid content were less critical than variations in the L-cysteine hydrochloride content as illustrated in Example 2 herein. With isoascorbic acid present, all loaves were of an acceptable quality, with the best loaf obtained at the 60 p.p.m. isoascorbic acid level. All levels of isoascorbic acid through 200 p.p.m. were beneficial in reducing the optimum mixing speed requirement of the dough. A preferred range of isoascorbic acid content is 30 to 100 p.p.m.

Figure 2:
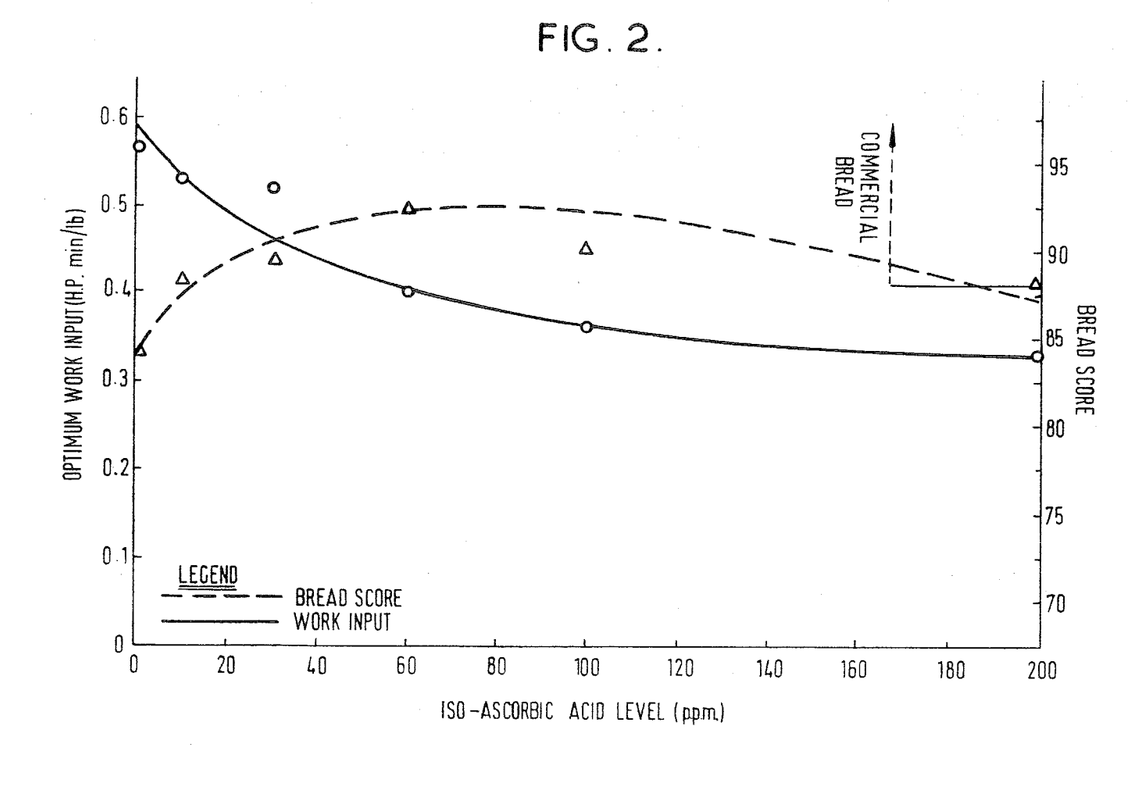

The advantageous results, in terms of reduced work input and better quality bread, resulting from the dough formulae containing a functional additive combination (in which the antioxidant is isoascorbic acid) in accordance with this invention, are illustrated in the graph shown as FIG. 2 of the accompanying drawings. In this graph, the calculated work input and bread score obtained in each of the six runs, are plotted against increasing isoascorbic acid content.

EXAMPLE 4

This example illustrates the use of a different antioxidant, butylated hydroxyanisole (BHA), in the functional additive combination of this invention.

In a series of seven separate runs, dough was continuously produced by the Amflow machine from the basic formula shown, using the "no-brew" procedure. In this instance, the formula included 70% water, which is high, and a functional additive combination comprising:

|  | P.p.m. (based on flour wt.) |
|---|---|
| L-cysteine hydrochloride (incremental amounts) | 0–100 |
| Butylated hydroxyanisole | 60 |
| Oxidant: |  |
|     Potassium bromate | 60 |
|     Potassium iodate | 10 |

The doughs so-obtained were proofed and baked as described above.

Results

The results are summarised in Table V which follows:

"no-brew" process of this invention giving bread of good quality when present in functional additive combinations containing up to 30 p.p.m. cysteine hydrochloride. At L-cysteine hydrochloride levels above 30 p.p.m. bread quality deteriorates, and at 100 p.p.m. it is unacceptable. The inclusion of 60 p.p.m. butylated hydroxyanisole in the functional additive combinations significantly reduced the optimum mixing speed requirements of the doughs as compared to equivalent doughs from which the butylated hydroxyanisole was omitted. Because of the higher water content (70% compared to 66%) used in this series, the optimum mixing speed requirement overall is higher than for comparable runs in previous examples. However, this high water content (absorption) is advantageous in affording increased yields, which is a very important feature to the bakery trade.

Figure 3:
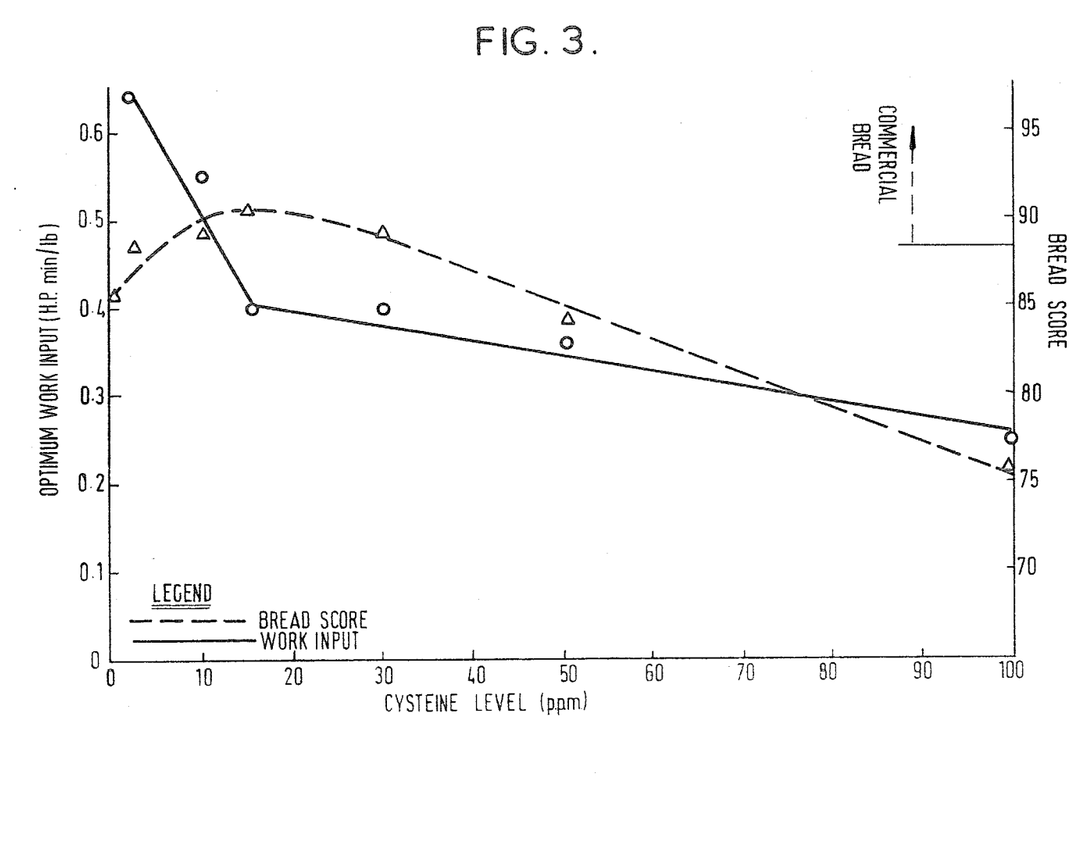

The good results, in terms of reduced work input and better quality bread, resulting from the dough formulae containing a functional additive combination (in which the antioxidant is butylated hydroxyanisole) in accordance with this invention, are illustrated in the graph shown as FIG. 3 of the accompanying drawings. In this graph, the calculated work input and bread score obtained in each of the seven runs, are plotted against increasing L-cysteine hydrochloride content. From the graph it can be seen that the desirable combination of good bread quality and reduced work input, is obtained only with the functional additive combination containing between 3 and 30 p.p.m. L-cysteine hydrochloride, with an optimum at 10 to 15 p.p.m.

EXAMPLE 5

This example illustrates the use of a different antioxidant, propyl gallate, in the functional additive combination of this invention.

In a series of seven separate runs, dough was continuously produced by the Amflow machine from the basic formula shown, using the "no-brew" procedure. In this instance, the dough formula included 70% water, and a functional additive combination comprising:

|  | P.p.m. (based on flour wt.) |
|---|---|
| L-cysteine hydrochloride | 15 |
| Propyl gallate (incremental amounts) | 0–100 |
| Oxidant: |  |
|     Potassium bromate | 60 |
|     Potassium iodate | 10 |

TABLE V

| Property | L-cysteine hydrochloride |||||||
|---|---|---|---|---|---|---|---|
|  | 0 p.p.m. | 3 p.p.m. | 10 p.p.m. | 15 p.p.m. | 30 p.p.m. | 60 p.p.m. | 100 p.p.m. |
| Optimum mixing(r.p.m.) | 230 | 225 | 215 | 200 | 190 | 175 | 150. |
| Dough characteristics | Slightly stiff; dry and not sticky. Moderately good extensibility, and physical characteristics. | Soft; dry and not sticky. Good extensibility and physical characteristics. | Soft; dry and not sticky. Good extensibility and physical characteristics. | Soft; dry and not sricky. Good extensibility and physical characteristics. | Soft; dry and not sticky. Good extensibility and physical characteristics. | Very soft; slightly wet and sticky. Poor mixing tolerance. Reduced water absorption. | Very soft; wet and sticky. No mixing tolerance. Reduced water absorption. Poor extensibility and physical characteristics. |
| Specific volume (cc./gm.) | 5.3 | 5.3 | 5.5 | 5.7 | 5.5 | 5.2 | 5.0. |
| Bread score | 85 | 88 | 89 | 91 | 89 | 84 | 76. |
| Bread characteristics | Marginal quality bread. Moderate volume. Open grain; harsh texture. Poor symmetry. | Good quality. Moderate volume. Fine uniform grain; soft velvety texture. | Very good quality bread. Good volume. Fine, uniform grain; soft velvety texture. | Excellent quality bread. High volume. Even shape. Fine, uniform grain; soft velvety texture. Nice flavor and aroma. | Good quality bread. Good volume. Fine, uniform grain; soft velvety texture. | Inferior quality bread. Moderate volume. Coarse open grain; harsh texture. | Unacceptable quality bread. Overmixed. Small volume. Coarse open grain; harsh texture. Poor symmetry. |

Conclusions

The results reported in the table show that butylated hydroxyanisole is an effective antioxidant for use in the The doughs so-obtained are proofed and baked as described above.

Results

The results are summarised in Table VI which follows:

"no-brew" process of this invention giving bread of good quality when present in the functional additive combina-

TABLE VI

| Property | Propyl gallate | | | | | | |
|---|---|---|---|---|---|---|---|
| | 0 p.p.m. | 3 p.p.m. | 15 p.p.m. | 30 p.p.m. | 60 p.p.m. | 100 p.p.m. | 200 p.p.m |
| Optimum mixing speed (r.p.m.) | 240 | 225 | 215 | 205 | 205 | 200 | 190. |
| Dough characteristics | Slightly soft, a little wet and sticky. Moderately good extensibility and physical characteristics. Reduced water absorption. | Less stiff; dry and not sticky. Good extensibility. | Soft, dry and not sticky. Good extensibility. | Soft; dry and not sticky. Good extensibility. | Soft; dry and not sticky. Good extensibility. | Soft; dry and not sticky. Good extensibility. | Very soft; slightly sticky. Good extensibility. |
| Total bread score | 83 | 88 | 89 | 90 | 91 | 89 | 88. |
| Bread characteristics | Inferior quality bread. Poor volume. Slightly open grain; harsh texture. Irregular shape. | Acceptable quality bread. Moderate volume. Fine uniform grain; soft texture. | Good quality bread. Good volume. Fine uniform grain; soft velvety texture. Nice, even shape. | Good quality bread. Excellent volume. Fine uniform grain; soft velvety texture. | Excellent quality bread. High volume. Fine uniform grain with thin cell walls and soft velvety texture. Best loaf of series. | Good quality bread. Good volume. Fine uniform grain; soft texture. Nice even shape. | Acceptable quality bread. Moderate volume. Fine uniform grain; soft texture. |

Conclusions

The results reported in the table show that propyl gallate is an effective antioxidant for use in the "no-brew" process of this invention giving bread of good quality when present in functional additive combinations at all levels up to 200 p.p.m. All levels of propyl gallate were beneficial in reducing the mixing speed requirement of the dough, though the experimental data indicates that it is not as effective in this respect as isoascorbic acid.

EXAMPLE 6

This example illustrates the use of a different antioxidant, butylated hydroxytoluene (BHT), in the functional additive combination of this invention.

Dough was continuously produced by the Amflow machine using the "no-brew" procedure and the basic dough formula with the water content at 70% and containing a functional additive combination comprising:

| | P.p.m. (based on flour wt.) |
|---|---|
| L-cysteine hydrochloride | 15 |
| Butylated hydroxytoluene | 60 |
| Oxidant: | |
| Potassium bromate | 60 |
| Potassium iodate | 10 |

The dough so-obtained was proofed and baked as described above.

Results

The results are summarised in Table VII which follows:

TABLE VII

| Property | 60 p.p.m. butylated hydroxytoluene. |
|---|---|
| Optimum mixing speed (r.p.m.) | 195. |
| Dough characteristics | Soft, dry and not sticky. Good extensibility and physical characteristics. Good water absorption. |
| Total bread score | 90. |
| Bread characteristics | Good quality bread. High volume. Fine uniform grain; soft, velvety texture. Nice, even shape. |

Conclusions

The results reported in the table show that butylated hydroxytoluene is an effective antioxidant for use in the tion. The calculated work input for this dough formula was 0.41 H.P. min./lb. compared to a calculated work input of 0.54 H.P. min./lb. for a comparable dough formula from which the butylated hydroxytoluene was omitted, so confirming that the butylated hydroxytoluene is effective in reducing work input requirements (and hence optimum mixing speed).

EXAMPLE 7

In this example the procedure of Part E of Example 1, in which a functional additive combination according to this invention was included in the dough formula, was repeated exactly except that the aqueous yeast slurry was heated to 80° F. and held at this temperature for 20 minutes prior to being chilled to 50° F., at which temperature it was stored and withdrawn as required. Heating the aqueous yeast slurry to 80° F. in this way assists in activating the compressed yeast cells so preparing them for the subsequent brisk evolution of carbon dioxide.

The mixing speed requirement of the dough in the developer stage was 150 r.p.m., and the bread produced was of good quality with a total bread score of 90.

EXAMPLE 8

Commercial baking trials

These trials were conducted in a commercial bakery using a standard production model of a continuous dough-making machine, i.e. Wallace & Tiernan Do-Maker 60, having a production capacity of 6,000 lbs. dough per hour. Using this machine and a regular formula, bread was made by the standard procedure of that bakery (control) and by the "no-brew" procedure of this invention.

In the "no-brew" procedure, the functional additive was incorporated in the dough formula through the addition of prepared bakery additive compositions, prepackaged in 50 lb. bags, comprising:

| Ingredient: | Content (wt. percent) |
|---|---|
| Wheat starch | 81.73 |
| L-cysteine hydrochloride | 0.40 |
| Ascorbic acid | 1.60 |
| Oxidant: [1] | |
| Potassium bromate | 1.60 |
| Potassium iodate | 0.27 |
| Ammonium sulfate (yeast food) | 13.40 |
| Tricalcium phosphate | 1.0 |

[1] In one composition, uncoated oxidant was present, in a second the oxidant was coated with 3% by weight "Myvacet" and in the third the oxidant was coated with 6% by weight "Myvacet."

All ingredients were in the form of finely divided, particulate solids with an average particle size of less than 250 microns, i.e. pass through a 60 mesh screen.

The dough formulae used are shown in the table which follows:

TABLE VIII

| Ingredient | Percent of flour (wt. basis) | |
|---|---|---|
| | Control | "No-brew" |
| Flour [1] | 100 | 100 |
| Water | 64 | 66 |
| Yeast | 2.4 | 3.0 |
| Liquid sugar (66% solids content) | 9.6 | 9.8 |
| Salt | 1.87 | 1.89 |
| Shortening | 2.75 | 2.75 |
| Milk powder | 1.0 | 1.0 |
| Enrichment | [2] | |
| Ammonium sulfate (yeast food) | 0.05 | 0.05 |
| Calcium propionate | 0.25 | 0.25 |
| L-cysteine hydrochloride | | 0.0015 |
| Ascorbic acid | | 0.0060 |
| Oxidant: | | |
|   Potassium bromate | 0.0060 | [3] 0.0060 |
|   Potassium iodate | 0.0012 | 0.0012 |
| Tricalcium phosphate | | 0.0001 |
| Starch | | 0.3 |

[1] Baker's grade.
[2] 1 tablet.
[3] Three different formulae:
  A—uncoated oxidant.
  B—coated oxidant (3%).
  C—coated oxidant (6%).

To provide the required levels of ingredients in the dough formula, the bakery additive compositions were incorporated at a level of 6 ounces for every 100 lbs. flour.

In the standard production procedure, all ingredients except the flour, shortening and oxidants were placed in a large tank and allowed to ferment for 2½ hours at 85° F. to give a liquid fermentation brew. This brew, the flour, the shortening and the oxidant (in the form of a solution) were metered through separate feed lines into the premixer, and pumped after premixing into the developer of the Do-Maker machine. The standard production operating conditions were employed. In the "no-brew" procedure, the compressed yeast was slurried with all the formula water at a temperature of 50° F. and kept chilled at about 45° F. until required. The aqueous yeast slurry; the shortening; a nutrient solution containing milk salt, calcium propionate and the liquid sugar; and the bakery additive composition were metered through separate feed lines into the premixer, and pumped after premixing into the developer of the Do-Maker machine. The relevant standard operating conditions were employed in the "no-brew" procedure, and the bakery additives were incorporated at a rate of 4 ounces per minute. In both procedures, the dough was panned, proofed, baked and the resulting bread cooled, sliced and wrapped in the usual way.

TABLE IX

| Property | Control | "No-Brew" procedure | | |
|---|---|---|---|---|
| | | A | B | C |
| Optimum mixing speed (r.p.m.) | 185 | 150 | 135 | 135 |
| Dough characteristics | Soft; dry and not sticky. Good extensibility and physical characteristics. | Soft; dry and not sticky. Good extensibility and physical characteristics. | Soft; dry and not sticky. Good extensibility and physical characteristics. | Soft; dry and not sticky. Good extensibility and physical characteristics. |
| Specific volume (cc./gm.) | 5.77 | 6.00 | 6.01 | 5.74 |
| Total bread score | 93 | 94.5 | 94.5 | 94 |

The detailed score for the bread resulting from each of the four runs is shown in Table X which follows:

TABLE X

| Characteristic | Perfect | Control | A | B | C |
|---|---|---|---|---|---|
| External: | | | | | |
|   Volume | 10 | 10 | 10 | 10 | 10 |
|   Color of crust | 8 | 7½ | 7½ | 7 | 7 |
|   Symmetry of form | 3 | 3 | 3 | 2½ | 2½ |
|   Evenness of bake | 3 | 2½ | 2½ | 2½ | 2½ |
|   Character of crust | 3 | 3 | 3 | 3 | 3 |
|   Break and shred | 3 | 2½ | 2½ | 2½ | 2½ |
| Internal: | | | | | |
|   Grain | 10 | 9 | 9½ | 9½ | 9½ |
|   Color of crumb | 10 | 9 | 9½ | 9½ | 9½ |
|   Aroma | 10 | 9½ | 9½ | 9½ | 9½ |
|   Taste | 15 | 14 | 14 | 14½ | 14½ |
|   Mastication (chewability) | 10 | 9 | 9½ | 9½ | 9½ |
|   Texture | 15 | 14 | 14 | 14½ | 14 |

Conclusions

The bread from all four runs was of excellent quality, but the bread from the "no-brew" procedures (Runs A to C) was slightly superior to the regular commercial bread (control) produced in this bakery by a standard continuous dough-making process. Thus, the bread obtained from the "no-brew" procedure when compared with the regular bread, was overall more uniform, had a better flavor and aroma; stronger sidewalls; less shrinkage; and better slicing characteristics. The 2% increase in water content i.e. increased water absorption, in the "no-brew" formulae gave a 2% increase in yield. This, plus the elimination of fermentation loss gave a significant increase in bread yield of around three loaves per cwt. flour. The significant reduction in the optimum mixing speed requirement with the "no-brew" procedure permitted an approximate 20% reduction in power input, thereby lowering the production costs, as did the elimination of the 2½ hour brew period through the use of the stable aqueous yeast slurry of essentially constant properties.

EXAMPLE 9

Commercial baking trial

This trial was conducted in a different commercial bakery, again using a Wallace & Tiernan Do-Maker 60, which was the regular production machine in this bakery. Using this machine and a regular formula, bread was made by the standard procedure of that bakery (control) and by the "no-brew" procedure of this invention.

In the "no-brew" procedure, the functional additive combination was incorporated through the addition of the prepared bakery additive composition of Example 8 wherein the oxidant was uncoated.

The dough formulae used are shown in the table which follows:

TABLE XI

| Ingredient | Percent of flour (wt. basis) | |
|---|---|---|
| | Control | "No-brew" |
| Flour [1] | 100 | 100 |
| Water | 62 | 63 |
| Yeast | 2.5 | 3.0 |
| Liquid sugar | 10.0 | 10.0 |
| Salt | 2.0 | 2.25 |
| Shortening | 3.0 | 3.0 |
| Milk powder | 1.0 | 1.0 |
| Guard | 0.25 | 0.25 |
| "Verv" | 0.40 | 0.40 |
| Enrichment (tablet) | [2] | |
| Monocalcium phosphate | 0.20 | 0.50 |
| Yeast food: | | |
|   Arkady | 0.30 | |
|   Ammonium sulfate | | 0.05 |
| L-cysteine hydrochloride | | 0.0015 |
| Ascorbic acid | | 0.0060 |
| Oxidant: | | |
|   Potassium bromate | 0.0050 | 0.0060 |
|   Potassium iodate | | 0.0010 |
| Azodicarbonamide | 0.0040 | |
| Tricalcium phosphate | | 0.0001 |
| Starch | | 0.30 |

[1] Baker's grade.
[2] 1 tablet.

To provide the required level of functional additives in the dough formula, the bakery additive compositions were incorporated at a level of 6 ounces for every 100 lbs. flour.

The standard production procedure and the "no-brew" procedure were essentially the same as in Example 8, involving a 2½ hour fermentation brew in the former, and a chilled, stable, aqueous yeast slurry in the latter. In both procedures, the dough was panned, proofed, baked and the resulting bread cooled, sliced and wrapped in the usual way.

Results

The results are shown in Table XII which follows:

TABLE XII

| Property | Control | "No-brew" |
| --- | --- | --- |
| Optimum mixing speed (r.p.m.). | 250 | 200. |
| Dough characteristics | Soft; dry and not sticky. Good extensibility and physical characteristics. | Soft; dry and not sticky. Good extensibility and physical characteristics. |
| Specific volume (cc./gm.). | 5.5 | 5.7. |
| Total bread score | 90 | 93.5. |

The detailed scores for the control and "no-brew" bread are shown in Table XIII which follows:

TABLE XIII

| Characteristic | Perfect | Control | "No-brew" |
| --- | --- | --- | --- |
| External: | | | |
| Volume | 10 | 9 | 10 |
| Color of crust | 8 | 7½ | 7½ |
| Symmetry of form | 3 | 2½ | 3 |
| Evenness of bake | 3 | 2½ | 2½ |
| Character of crust | 3 | 2½ | 2½ |
| Break and shread | 3 | 2 | 2½ |
| Internal: | | | |
| Grain | 10 | 9 | 9½ |
| Color of crumb | 10 | 9 | 9 |
| Aroma | 10 | 9 | 9 |
| Taste | 15 | 14 | 14½ |
| Mastication (chewability) | 10 | 9 | 9½ |
| Texture | 15 | 14 | 14 |

Conclusions

Whilst both the regular and the 'no-brew" bread were of excellent quality, the latter had a better flavor and aroma; stronger sidewalls; and better slicing characteristics (fewer slicer and wrapper cripples) because of the improved body. In the "no-brew" procedure, the mixing speed was reduced to an optimum level of 200 r.p.m., so that the production rate (throughput) was the same as for the standard 2½ hour fermentation brew procedure, but the power consumption was substantially reduced. The 1% increase in the water content gave a better yield in the "no-brew" process.

It will be apparent from the foregoing examples, therefore, that in contrast to continuous dough-making processes as presently practised which usually involve the fermentation of a liquid brew for upwards of 2½ hours, our improved process provides for the complete omission of the preliminary liquid fermentation brew step. This is accomplished by the use of a chilled and stable, aqueous yeast slurry and a functional additive combination which, by promoting the biochemical changes normally occurring in the fermentation period, plays an essential part in developing and maturing the dough. The non-fermented, aqueous yeast slurry is taken directly to the premixer for blending with the formula flour, other standard dough ingredients and the functional additive combination, after which the viscous batter is transferred to the developer. The developed dough is extruded and then proofed and baked in the usual way. The resulting baked goods are equivalent, and the often superior, in quality to baked goods made according to regular continuous dough-making processes and in many instances there is a marked improvement in aroma and flavor, texture and sidewall strength.

The advantages of our novel and improved process may be summarised as follows:

In eliminating, through chemical development of the dough by the defined functional additive combination, the lengthy preliminary liquid fermentation brew step, the process is much less time-consuming and also more flexible so that, for instance, demands for additional bread at short notice can be readily accommodated or production can be started relatively late in the day in order to meet special requirements. For this purpose, it is convenient to keep on hand a batch of the aqueous yeast slurry, which, since, the initiation of fermentation reactions has been avoided, is relatively stable when kept slightly chilled, say, between 45° to 50° F.

The process according to the invention, due to the elimination of the liquid fermentation brew, has the advantage of saving labor costs through reduced handling, and of reducing the water requirements and the need for investment in large floor areas and equipment, especially the provision of a considerable number of relatively expensive brew tanks. Moreover, in contrast with a liquid fermentation brew which is very viscous, especially when, as is quite common today, it contains a substantial proportion, say up to 50%, of the total flour, the aqueous yeast slurry, which contains no flour, may be pumped and metered into the mixer without difficulty.

A further advantage is that the elimination of the liquid fermentation step and thereby of fermentation loss, which includes lost water, flour and sugar, makes it possible for the baker, who is accustomed to incorporating some of the total flour into the fermenation brew, to realise as many as 2% extra dough pieces per bag of flour. The superior water-absorption capacity of the doughs containing the functional additive combinations also further increase the yield. This increased yield is of a considerable significance for a profitable bakery operation.

The replacement of a fermentation brew of variable properties, which differ not only between brews but (progressively with time) in the same brew, by a non-fermented and stable, aqueous yeast slurry of nearly constant properties gives a more constant effect in developing the dough and, in turn, more uniform bread.

With regard to the reduction of the mixing speed requirements resulting from the presence of the functional additive combination, this is advantageous in providing either for an increase in the throughput (production rate), when the power consumption is held constant, or a reduction in the power consumption, when the throughput is held constant. The net effect in either case is a reduction in the baker's production costs.

In short, the process of this invention gives good quality bread and like yeast-leavened products in the complete absence of a liquid fermentation brew and with significantly reduced mixing speed requirements in the developer stage; this combination makes possible a marked reduction in production costs.

Many modifications and variations of this invention will appear to those skilled in the art which do not depart from the scope thereof. For instance, the "no-brew" process of this invention can be satisfactorily employed in producing yeast-leavened bakery products other than bread such as, for example, buns and rolls. Also, the reducing agent need not be L-cysteine hydrochloride, but may be, for example, glutathione or a bisulfite salt like sodium bisulfite, in which event the upper limit of the operable levels may be slightly different from the cysteine level because of the different molecular weight. Since it is not feasible to exemplify all possible variations of this invention, it is to be understood that the invention is not limited to the specific embodiments illustrated herein.

What is claimed is:

1. A continuous dough-making process for making bread and like yeast-leavened products which comprises forming a stable aqueous yeast slurry by commingling yeast with water with essentially no distinct fermentation step conventionally involved in the formation of a liquid fermentation brew, forming a batter by admixing this yeast slurry with standard dough ingredients including flour, shortening, sugar and salt, and a functional additive combination comprising, in parts per million, expressed on a flour weight basis:

about 3 to about 30 parts of a food grade soulfhydryl-containing reducing agent;

about 3 to about 200 parts of a food grade antioxidant; and     about 30 to about 100 parts of a food grade oxidizing agent, transferring the batter so-formed to an enclosed, high-speed continuous developer stage, mixing the batter, to form a dough, under reduced mixing speed requirements relative to a batter of like composition except that it does not contain said combination of functional additives in the developer stage, depositing the dough in pans, and proofing and baking the deposited dough to form the product.

2. A continuous dough-making process for making bread and like yeast-leavened products which comprises forming a stable aqueous yeast slurry by commingling yeast with water at a temperature lower than the yeast fermentation temperature, thereby avoiding any substantial gas production, chilling the aqueous yeast slurry to a temperature between about 35° and about 55° F., and holding it at a temperature in this range until required, withdrawing the non-fermented, stable aqueous yeast slurry from storage and passing it to a premixer, to form a batter, wherein it is admixed with standard dough ingredients including flour, shortening, sugar and salt and a functional additive combination comprising, in parts per million, expressed on a flour weight bases:

about 3 to about 30 parts of a food grade sulfhydryl-containing reducing agent;

about 3 to about 200 parts of a food grade antioxidant; and     about 30 to about 100 parts of a food grade oxidizing agent, transferring the batter so-formed to an enclosed, high-speed continuous developer stage, mixing the batter, to form a dough, under reduced mixing speed requirements relative to a batter of like composition except that it does not contain said combination of functional additives in the developer stage, depositing the dough in pans, and proofing and baking the deposited dough to form the products.

3. The process of claim 2, wherein the functional additive combination comprises, in parts per million, expressed on a flour weight basis:

about 3 to about 30 parts L-cysteine hydrochloride;

about 30 to about 200 parts of an antioxidant selected from the group consisting of isoascorbic acid, ascorbic acid, propyl gallate, butylated hydroxyanisole, butylated hydroxytoluene and mixtures thereof; and     about 30 to about 75 parts of bromate salts or iodate salts or bromate and iodate salts.

4. The process of claim 3, wherein the L-cysteine hydrochloride is present at a level between 10 and 20 parts per million, expressed on a flour weight basis.

5. The process of claim 2, wherein the functional additive composition comprises, in parts per million, expressed on a flour weight basis:

about 3 to about 30 parts L-cysteine hydrochloride;

about 3 to 200 parts of an antioxidant selected from the group consisting of ascorbic acid and isoascorbic acid; and     about 30 to about 75 parts of bromate salts or iodate salts or bromate and iodate salts.

6. A continuous dough-making process for making bread and like yeast-leavened products which comprises forming a stable aqueous yeast slurry by commingling yeast with water at a temperature lower than the yeast fermentation temperature, thereby avoiding any substantial gas production, chilling the aqueous yeast slurry to a temperature between about 35° and about 55° F. and holding it at a temperature in this range until required, withdrawing the non-fermented aqueous yeast slurry from storage and passing it into a premixer, additionally introducing into the premixer all the other dough ingredients and a prepared bakery additive composition in the amount of 0.04 ounce to 6 pounds per 100 pounds of flour in the form of a dry mix containing a non-toxic carrier and, intimately blended therewith, a functional additive combination comprising:

0.05 to 1.2 percent by weight, based on the weight of the composition, of a food grade sulfhydryl-containing reducing agent;

0.2 to 4.8 percent by weight, based on the weight of the composition, of a food grade antioxidant; and     0.24 to 5.7 percent by weight, based on the weight of the composition, of a food grade oxidizing agent, forming a batter by admixing the different ingredients in the premixer, transferring the batter, to form a dough, to an enclosed, high-speed, continuous developer stage, under reduced mixing speed requirements relative to a batter of like composition which does not contain said additive composition in the developer stage, depositing the dough in pans, and proofing and baking the deposited dough to form the products.

7. A continuous dough-making process for making yeast-leavened bakery products which comprises commingling the yeast with water at a temperature below the yeast fermentation temperature, forming a battery by incorporating a functional additive combination comprising, in parts per million, expressed on a flour weight basis:

about 3 to about 30 parts of a food grade sulfhydryl-containing reducing agent;

about 3 to about 200 parts of a food grade antioxidant; and     about 30 to about 100 parts of a food grade oxidizing agent, along with the standard dough ingredients prior to the developer stage, forming a dough by mixing the batter in the developer stage under substantially reduced mixing speed requirements relative to a dough not containing said combination of functional additives, depositing the dough in pans, and proofing and baking the deposited dough to form the products.

8. A continuous dough-making process for making bread and like yeast-leavened products which comprises forming an aqueous yeast slurry by commingling yeast with water, holding said slurry at a temperature of around 80° F. for up to about 20 minutes to activate the yeast cells, forming a batter by admixing this yeast slurry with standard dough ingredients including flour, shortening, sugar and salt, and a functional additive combination comprising, in parts per million, expressed on a flour weight basis:

about 3 to about 30 parts of a food grade sulfhydryl-containing reducing agent;

about 3 to about 200 parts of a food grade antioxidant; and     about 30 to about 100 parts of a food grade oxidizing agent, transferring the batter to an enclosed, high-speed continuous developer stage, forming a dough by mixing the batter under reduced mixing speed requirements relative to a batter of like composition except that it does not contain said functional additives in the developer stage, depositing the dough in pans, and proofing and baking the deposited dough to form the products.

9. A prepared bakery additive composition for use in a continuous dough-making process, said composition being in the form of a dry mix containing a non-toxic carrier and, intimately blended therewith, a functional additive combination comprising:

0.05 to 1.20 percent by weight, based on the weight of the composition, of a food grade sulfhydryl-containing reducing agent;

0.20 to 4.80 percent by weight, based on the weight of the composition, of a food grade antioxidant; and 0.24 to 5.70 percent by weight, based on the weight of the composition, of a food grade oxidizing agent.

10. A prepared bakery additive composition as claimed in claim 9, in which the oxidizing agent is coated with effect-delaying material.

11. A prepared bakery additive composition as claimed in claim 9 in which the oxidizing agent is coated with an effect-delaying material selected from the group consisting of glyceryl monostearates, acetylated monoglycerides, gelatin, carboxymethyl cellulose, aluminum tristearate, polyvinylpyrollidone, sodium caseinate and vegetable gums.

12. A prepared bakery additive composition for use in a continuous dough-making process, said composition being in the form of a dry mix containing:

| | Content (wt. percent) |
|---|---|
| A non-toxic carrier selected from the group consisting of starch, flour and mixtures thereof | 92.54–73.15 |
| A reducing agent selected from the group consisting of L-cysteine hydrochloride, glutathione, bisulfite salts and mixtures thereof | 0.15–0.60 |
| An antioxidant selected from the group consisting of isoascorbic acid, ascorbic acid, propyl gallate, butylated hydroxyanisole, butylated hydroxytoluene and mixtures thereof | 0.60–2.40 |
| Potassium bromate | 0.60–2.40 |
| Potassium iodate | 0.11–0.45 |
| Yeast food | 5.00–20.00 |
| Anti-caking agent | 1.00 |

13. A prepared bakery additive composition for use in a continuous dough-making process, said composition being in the form of a dry mix containing:

| | Content (wt. percent) |
|---|---|
| Wheat starch | 81.73 |
| L-cysteine hydrochloride | 0.40 |
| Ascorbic acid | 1.60 |
| Potassium bromate | 1.60 |
| Potassium iodate | 0.27 |
| Ammonium sulfate | 13.40 |
| Tricalcium phosphate | 1.0 |

14. A prepared bakery additive composition as claimed in claim 13, in which the potassium bromate and potassium iodate are coated with a glyceryl monostearate or an acetylated monoglyceride.

References Cited

UNITED STATES PATENTS

| | | | |
|---|---|---|---|
| 2,889,227 | 6/1959 | Ofelt et al. | 99—91 |
| 3,006,765 | 10/1961 | Ferrari | 99—90 |
| 3,053,666 | 9/1962 | Henika et al. | 99—90 |
| 3,219,455 | 11/1965 | Dubois | 99—90 |
| 3,304,183 | 2/1967 | Johnston et al. | 99—90 |
| 3,490,916 | 1/1970 | Henika | 99—90 |
| 3,494,770 | 2/1970 | Smerak et al. | 99—90 |

FOREIGN PATENTS 715,508  8/1965  Canada.

RAYMOND N. JONES, Primary Examiner

J. R. HOFFMAN, Assistant Examiner

U.S. Cl. X.R.

99—90CB, 93